United States Patent
Kim

(10) Patent No.: US 8,253,875 B2
(45) Date of Patent: Aug. 28, 2012

(54) BACKLIGHT ASSEMBLY COMPRISING A MOLD FRAME INTEGRALLY CONNECTED TO A LIGHT GUIDE PLATE AND LIQUID CRYSTAL DISPLAY HAVING THE SAME

(75) Inventor: Tae Seok Kim, Suwon-Si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 442 days.

(21) Appl. No.: 12/126,226

(22) Filed: May 23, 2008

(65) Prior Publication Data

US 2008/0291356 A1 Nov. 27, 2008

(30) Foreign Application Priority Data

May 25, 2007 (KR) .................. 10-2007-0050953

(51) Int. Cl.
*G02F 1/1333* (2006.01)
*G02F 1/1335* (2006.01)
*F21V 7/04* (2006.01)

(52) U.S. Cl. ............. 349/58; 349/65; 349/67; 362/628; 362/629; 362/633; 362/634

(58) Field of Classification Search .................. 349/58, 349/65, 67; 362/615, 628–629, 632–634
See application file for complete search history.

(56) References Cited

U.S. PATENT DOCUMENTS

| | | | | |
|---|---|---|---|---|
| 6,806,920 | B2 * | 10/2004 | Hayashi et al. | 349/58 |
| 7,651,257 | B2 * | 1/2010 | Shin | 362/633 |
| 7,724,317 | B2 * | 5/2010 | Kim et al. | 349/58 |
| 2001/0035923 | A1 * | 11/2001 | Cha et al. | 349/65 |
| 2005/0052588 | A1 * | 3/2005 | Saito et al. | 349/58 |
| 2006/0268189 | A1 * | 11/2006 | Kiyohara | 349/58 |

* cited by examiner

*Primary Examiner* — Mark Robinson
*Assistant Examiner* — Dennis Y Kim
(74) *Attorney, Agent, or Firm* — F. Chau & Associates, LLC

(57) ABSTRACT

A backlight assembly and a liquid crystal device having the same. The backlight assembly includes a light guide plate, a first mold frame integrally formed with the light guide plate, a light source unit disposed on at least one side of the light guide plate and comprising a light source spaced apart from the at least one side of the light guide plate and a light reflector surrounding the light source and connected to the light guide plate, a light reflector surrounding the light source and connected to the light guide plate, and a second mold frame connected to the first mold frame and disposed on the light reflector.

24 Claims, 15 Drawing Sheets

BACKLIGHT ASSEMBLY COMPRISING A MOLD FRAME INTEGRALLY CONNECTED TO A LIGHT GUIDE PLATE AND LIQUID CRYSTAL DISPLAY HAVING THE SAME

CROSS-REFERENCE TO RELATED APPLICATION

This application claims priority to Korean Patent Application No. 10-2007-0050953 filed on May 25, 2007, the contents of which are incorporated by reference in their entirety.

BACKGROUND

The present disclosure relates to a backlight assembly, and more particularly, to a backlight assembly, in which a light guide plate and a part of a mold frame are integrally formed, and a liquid crystal display having the backlight assembly.

Liquid crystal displays (LCDs) are display devices that display an image using the change in transmittance of liquid crystals according to image signals applied to a plurality of control switches arranged in a matrix form. An LCD includes a liquid crystal display panel configured to directly display an image, a driver configured to drive the liquid crystal display panel, a backlight assembly serving as a light source of the LCD, and a chassis on which the respective components of the LCD are assembled.

A backlight assembly includes a light source, an optical sheet, and a light guide plate. These components of the backlight assembly are received in a mold frame. However, because the mold frame is thin and weak, it may be bent or tilted during a manufacturing process or may be shrunk during a high temperature reliability test. Further, the outer shape of the mold frame may be deformed when the light guide plate is mounted thereto. This deformation is referred to as "pooling".

Furthermore, with diversification of backlight assembly components, the number of assembling processes increases, which increases manufacturing time, leading to an increase in assembly failure probability.

SUMMARY

Embodiments of the present invention provide a backlight assembly, in which a light guide plate and a mold frame are integrally formed to increase their strength, and an LCD having the backlight assembly.

Embodiments of the present invention also provide a backlight assembly with improved quality, reliability and productivity, by reducing the number of assembling operations and assembling time, and an LCD having the backlight assembly.

In accordance with an exemplary embodiment, a backlight assembly includes a light guide plate, a first mold frame integrally formed with the light guide plate, a light source unit disposed on at least one side of the light guide plate, and a second mold frame connected to the first mold frame.

The light source unit may include a light source spaced apart from the side of the light guide plate, and a light reflector disposed to surround the light source and connected to the light guide plate, the second mold frame being disposed on the light reflector.

The first mold frame may include a sidewall portion connected to sides of the light guide plate to define a receiving space.

The light guide plate may be formed of a light transparent resin, and the first mold frame may be formed of a light opaque resin and has a greater hardness than that of the light guide plate.

The light source unit may be disposed on a first side of the light guide plate, and the sidewall portion of the first mold frame may be connected to sides of the light guide plate other than the first side.

The light source unit may be disposed on a first side and a second side of the light guide plate, the second side being opposite to the first side, and the sidewall portion of the first mold frame may be connected to sides of the light guide plate other than the first and second sides.

The backlight assembly may further include a plurality of optical sheets disposed within the receiving space, and a reflection film disposed under the light guide plate.

The first mold frame may further include a groove at a lower portion of the sidewall portion, and the reflection film may be disposed within the groove.

The backlight assembly may further include an adhesive member disposed to overlap bottom surfaces of the reflection film and the sidewall portion of the first mold frame.

The first mold frame may further include an overlapping portion extending inwardly from a lower portion of the sidewall portion and connected to a part of a bottom surface of the light guide plate.

The backlight assembly may further include an adhesive member disposed to overlap bottom surfaces of the reflection film and the overlapping portion.

The backlight assembly may further include a back cover disposed to surround the light source unit, and a first coupling member fixing the back cover to the first mold frame.

The backlight assembly may further include a second coupling member fixing the light source unit to the first mold frame.

The second coupling member may include a coupling groove or a coupling protrusion formed on two sides of the sidewall portion of the first mold frame, and a coupling protrusion or a coupling groove formed on two sides of the second mold frame.

The light source may include a lamp and a power cable connected to two sides of the lamp.

The second mold frame may include an alignment groove, and the power cable may be disposed within the alignment groove.

The light source may include a circuit board and a light emitting diode mounted on the circuit board The light source unit may further include an adhesive member disposed between a top surface of the light reflector and the second mold frame.

The light guide plate and the first mold frame may be integrally formed by injection molding.

In accordance with an exemplary embodiment, a liquid crystal display includes a backlight assembly and a liquid crystal display panel. The backlight assembly includes a light guide plate, a first mold frame formed of a material different from that of the light guide plate and integrally formed with the light guide plate, a light source unit disposed on a side of the light guide plate, and a second mold frame connected to the first mold frame. The light source unit includes a light source spaced apart from the side of the light guide plate, and a light reflector disposed to surround the light source and connected to the light guide plate. The second mold frame is disposed on the light reflector. The liquid crystal display panel is disposed on the backlight assembly to display an image.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments will be described in more detail with reference to the accompanying drawings.

Figure 1:
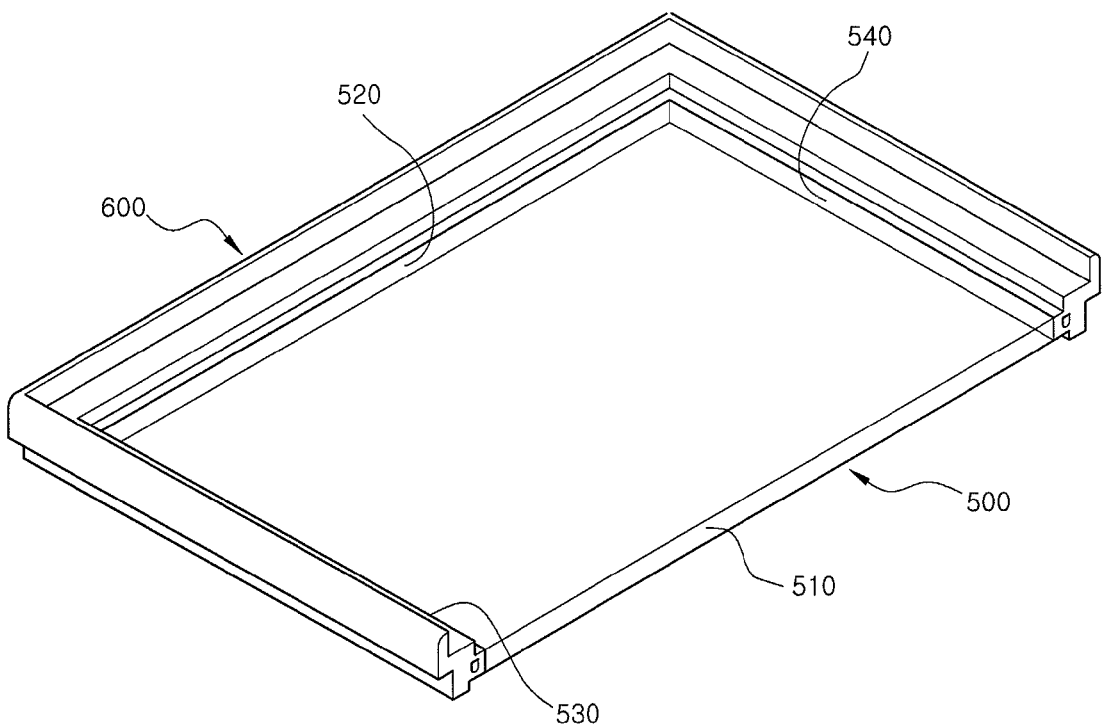
FIG. 1 is a perspective view of a light guide plate and a first mold frame of a backlight assembly in accordance with an exemplary embodiment.
Figure 2:
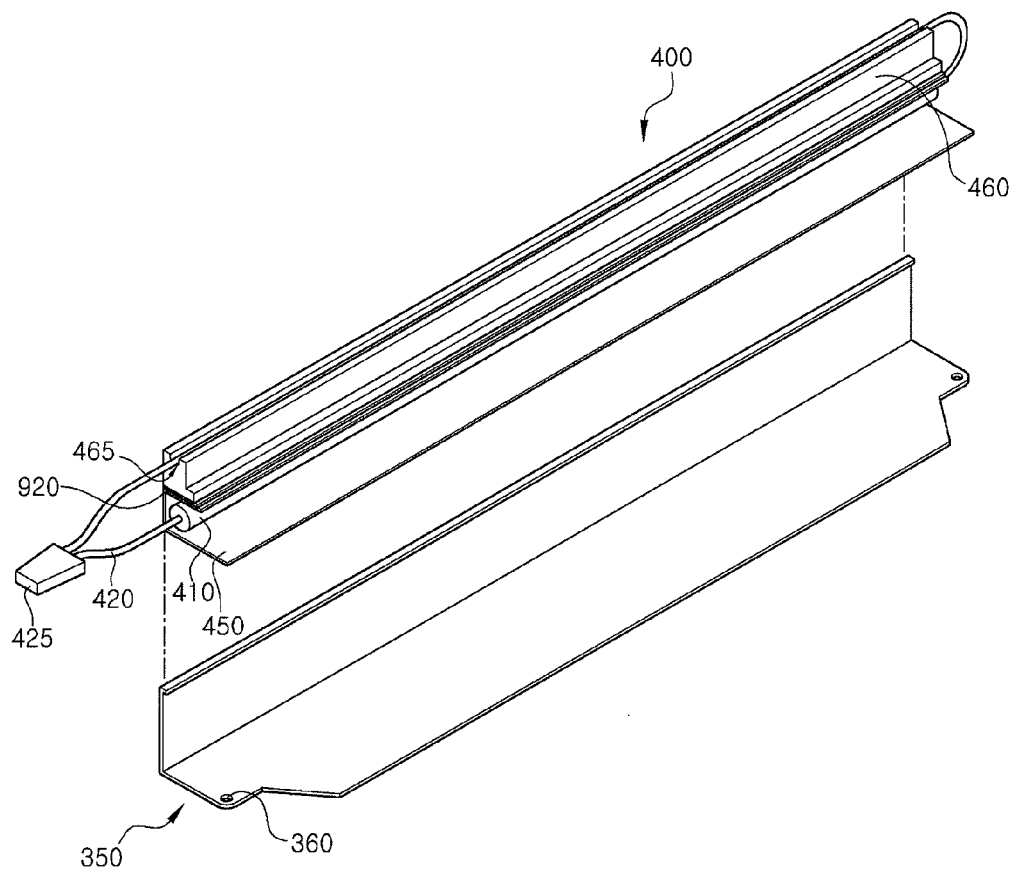
FIG. 2 is an exploded perspective view of a light source unit and a back cover of a backlight assembly in accordance with an exemplary embodiment.

FIG. 1 is a perspective view of a light guide plate and a first mold frame of a backlight assembly in accordance with an exemplary embodiment, and FIG. 2 is an exploded perspective view of a light source unit and a back cover of the backlight assembly in accordance with the exemplary embodiment.

Referring to FIG. 1, the backlight assembly includes a light guide plate 500 and a first mold frame 600.

The light guide plate 500 converts point or line light from a light source unit (not shown) into surface light. The light guide plate 500 may be formed of a light transparent resin, for example, polymethymethacrylate (PMMA).

The light guide plate 500 may be formed in a rectangular or square shape by injection molding. The light guide plate 500 may be a parallel type light guide plate with constant thickness or a wedge type light guide plate with a thickness gradually decreasing from one end to the other. In addition, prism patterns or diffusion patterns may be further formed on a rear surface or a top surface of the light guide plate 500 so as to scatter and reflect light incident from the light source. The prism patterns or the diffusion patterns can be formed using various processes, for example, a printing process or a molding process.

The first mold frame 600 is formed of a material different from that of the light guide plate 500. The first mold frame 600 is integrally formed with the light guide plate 500 along at least a portion of an outer periphery of the light guide plate 500. While the light guide plate 500 and the first mold frame 600 can be formed integrally by injection molding, the forming method is not limited thereto.

The first mold frame 600 has a relatively greater hardness than the light guide plate 500. The first mold frame 600 is formed of a light opaque resin, for example, polycarbonate (PC) or a mixture of polycarbonate (PC) and acrylonitrile butadiene styrene copolymer (ABS).

The first mold frame 600 is integrally connected and attached to second through fourth sides 520, 530 and 540, but not to a first side 510, of the light guide plate 500. The shape and structure of the first mold frame 600 are not limited to those of FIG. 1, but can be modified in various ways.

Because the light guide plate 500 and the first mold frame 600 are integrally formed, the strength of the first mold frame 600 can be increased and the "pooling" phenomenon that occurs when the light guide plate 500 is mounted to the first mold frame 600 can be prevented. Further, an assembling process is simplified because two parts are replaced with one part.

A light source unit 400, a back cover 350, and a second mold frame 460 are illustrated in FIG. 2.

Referring to FIG. 2, the light source unit 400 includes a lamp 410, a power cable 420, a connector 425, and a light reflector 450. The second mold frame 460 is connected to the light source unit 400.

The light source unit 400 is disposed on the first side 510 of the light guide plate 500 and provides light to the light guide plate 500.

The lamp 410 may be a cold cathode fluorescent lamp (CCFL) or an external electrode fluorescent lamp (EEFL). The lamp 410 may have, but is not limited to, an I-shape.

The lamp 410 includes a phosphor layer (not shown) and a discharge gas (not shown). Electrodes (not shown) are provided on both sides of the lamp 410. The electrodes are connected to the power cable 420, and the connector 425 is connected to both ends of the power cable 420. When power is supplied to the electrodes of the lamp 410 through the connector 425 and the power cable 420, the discharge gas inside the lamp 410 is converted into plasma, and invisible light is generated. The invisible light stimulates the phosphor layer to emit visible light to the outside.

The light reflector 450 is formed to surround the lamp 410 and is connected to the light guide plate 500 of FIG. 1. The light reflector 450 is formed of a high reflectance metal. The light reflector 450 with one side open is bent to surround the lamp 410. In this exemplary embodiment, the light reflector 450 has a rectangular cross-section with an open side. However, the light reflector 450 is not limited to this shape. For example, the light reflector 450 may have a circular or elliptical cross-section with a side or a portion thereof being open.

The second mold frame 460 is disposed on the light reflector 450. An adhesive member 920 is disposed between the second mold frame 460 and the light reflector 450. The adhesive member 920 fixes the second mold frame 460 to the light reflector 450. The adhesive member 920 may include, but is not limited to, double-sided adhesive tape.

An alignment groove 465 is formed on a top surface of the second mold frame 460. The power cable 420 is disposed within the alignment groove 465. The second mold frame 460 is formed of the same material as the first mold frame 600. However, the second mold frame 460 and the first mold frame 600 are separately formed. The second mold frame 460 has a relatively greater hardness than the light guide plate 500 and is formed of a light opaque resin, for example, polycarbonate (PC) or a mixture of polycarbonate (PC) and acrylonitrile butadiene styrene copolymer (ABS).

The back cover 350 with an open side is bent to surround the light source unit 400 and the second mold frame 460. A coupling hole 360 may be formed in a bottom surface of the back cover 350 so as to fix the back cover 350 to the first mold frame 600 of FIG. 1.

Figure 3:
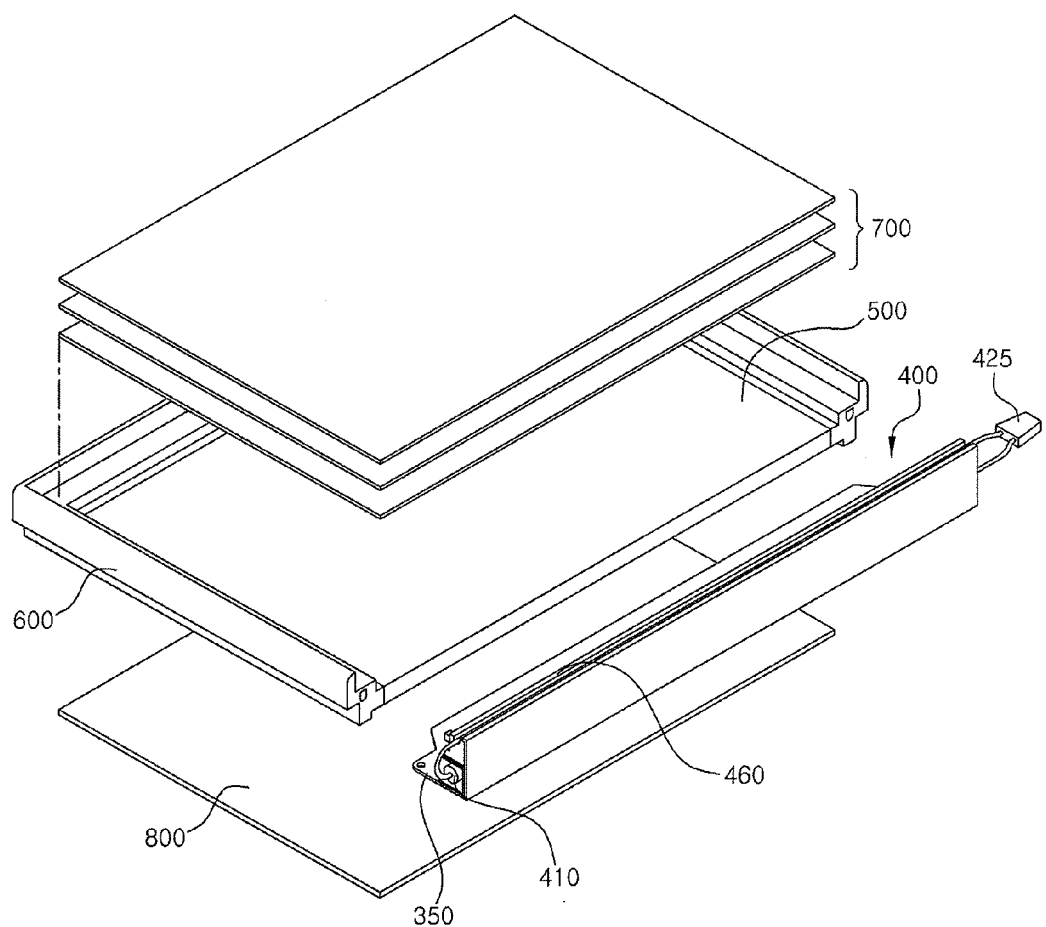
FIG. 3 is an exploded perspective view of a backlight assembly in accordance with an exemplary embodiment.
Figure 4:
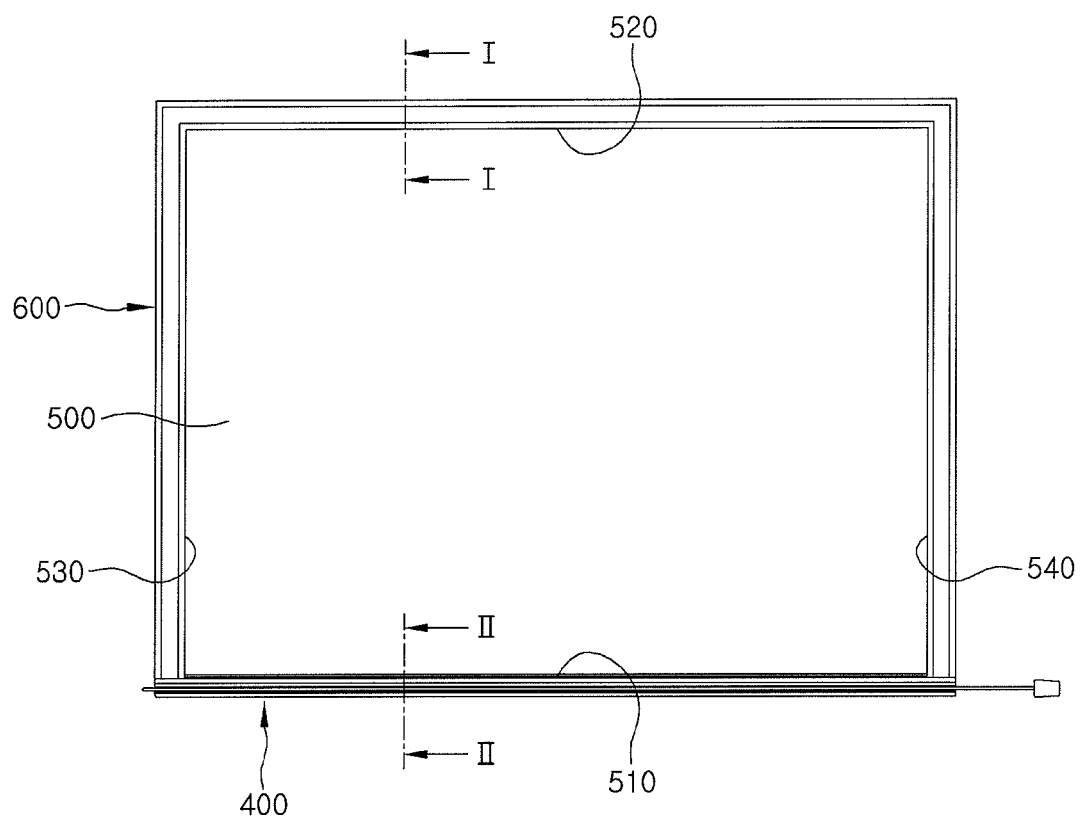
FIGS. 4 and 5 are a front view and a rear view, respectively, illustrating an assembled state of a backlight assembly in accordance with an exemplary embodiment.
Figure 5:
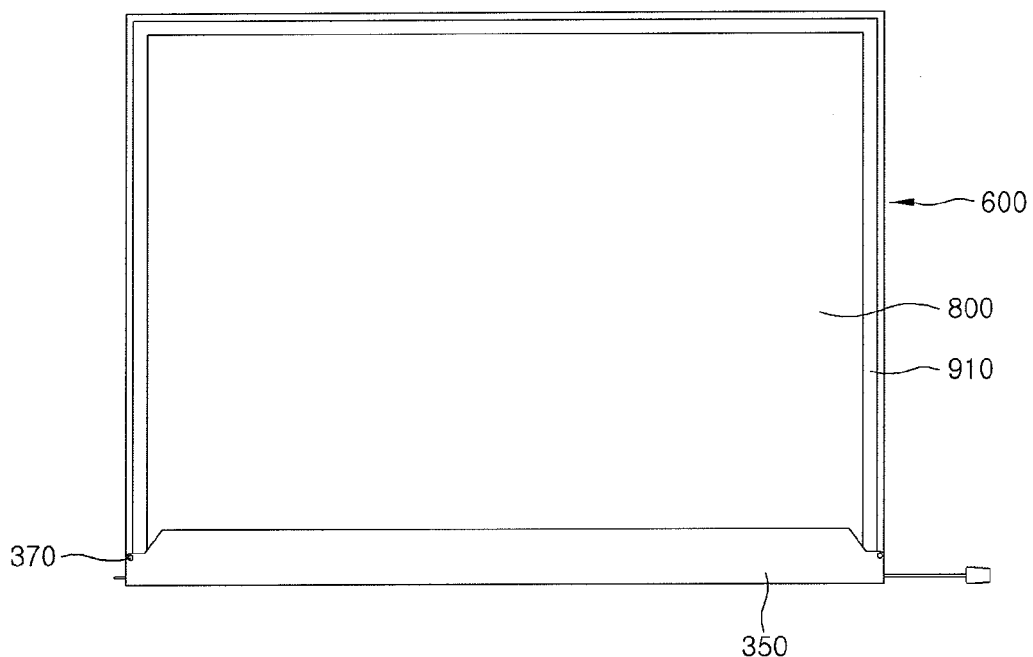
Figure 6:
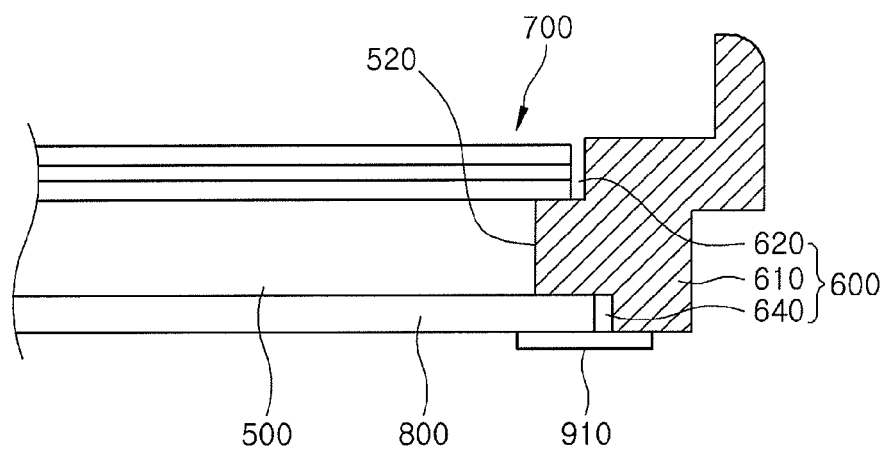
FIG. 6 is a cross-sectional view taken along line I-I of FIG. 4.
Figure 7:
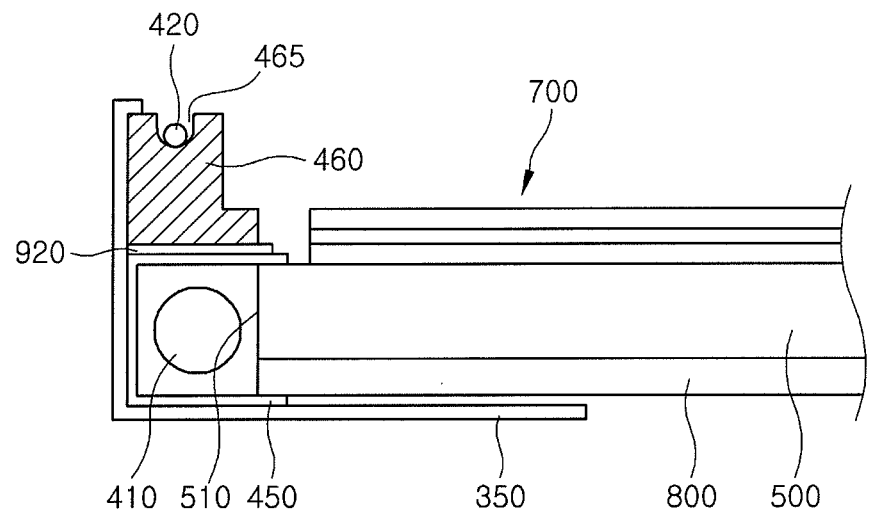
FIG. 7 is a cross-sectional view taken along line II-II of FIG. 4.

FIG. 3 is an exploded perspective view of a backlight assembly in accordance with the exemplary embodiment. FIGS. 4 and 5 are a front view and a rear view, respectively, illustrating an assembled state of the backlight assembly in accordance with an exemplary embodiment. FIG. 6 is a cross-sectional view taken along line I-I of FIG. 4, and FIG. 7 is a cross-sectional view taken along line II-II of FIG. 4.

Referring to FIGS. 3 through 5, the backlight assembly includes the light guide plate 500, the first mold frame 600, a plurality of optical sheets 700, a reflection film 800, the light source unit 400, the second mold frame 460, and the back cover 350. The light guide plate 500 and the first mold frame 600 are integrally formed.

The plurality of optical sheets 700 are disposed on the light guide plate 500 to provide uniform brightness distribution of light emitted from the light guide plate 500. The plurality of optical sheets 700 may include a diffusion sheet, a prism sheet, and a protection sheet. The diffusion sheet diffuses light incident from the light guide plate 500 to enhance luminance uniformity. The prism sheet concentrates the diffused light in a vertical direction with respect to a screen of the liquid crystal display panel. The protection sheet is disposed on and protects the prism sheet. The plurality of optical sheets are not limited to the above-mentioned sheets. Other optical sheets having various functions can also be used. Although the plurality of optical sheets are used in this exemplary embodiment, a single optical sheet having multiple functions can also be used.

A side of the light guide plate 500 and the first mold frame 600, which are integrally formed, will be exemplarily described below. The light source unit 400 and the second mold frame 460 are disposed on the first side 510 of the light guide plate 500. Light emitted from the lamp 410 is incident onto the first side 510 of the light guide plate 500.

The reflection film 800 is disposed under the light guide plate 500 and reflects light emitted from the bottom surface of the light guide plate 500 toward the liquid crystal display panel (not shown), thereby reducing loss of light.

The back cover 350 with an open side is bent to surround the light source unit 400 and the second mold frame 460. In order to support the light source unit 400 and the reflection film 800, the back cover 350 is connected and fixed to the first mold frame 600 by a screw 370. In this exemplary embodiment, although the screw 370 is used for connecting the back cover 350 to the first mold frame 600, a variety of coupling members can also be used.

Referring to FIG. 6, the first mold frame 600 includes a sidewall portion 610, a first mounting groove 620, and a second mounting groove 640.

The sidewall portion 610 of the first mold frame 600 runs around a perimeter of the light guide plate 500 and is connected to sides of the light guide plate 500, for example, the second side 520, the third side 530, and the fourth side 540. At this point, the first mold frame 600 and the light guide plate 500 are integrally formed. The first mounting groove 620 is formed in an upper, inner surface of the sidewall portion 610. Consequently, the first mold frame 600 has a step-shaped cross-section to provide a receiving space. The plurality of optical sheets 700 are disposed within the receiving space.

The second mounting groove 640 is formed in a lower inner surface of the sidewall portion 610. The reflection film 800 is disposed under the light guide plate 500. A periphery of the reflection film 800 is disposed within the second mounting groove 640.

In order to fix the reflection film 800 disposed under the light guide plate 500, the adhesive member 910 is disposed to overlap bottom surfaces of the reflection film 800 and the sidewall portion 610. Although adhesive tape is used in this exemplary embodiment, the adhesive member 910 is not limited thereto.

Referring to FIG. 7, the light source unit 400 is disposed on the first side 510 of the light guide plate 500 and includes the lamp 410, the power cable 420, the connector (not shown), and the light reflector 450. The second mold frame 460 is connected to the light source unit 400.

The lamp 410 is spaced apart from the first side 510 of the light guide plate 500, and the light reflector 450 is connected to the first side 510 of the light guide plate 500. A side of the reflection film 800 may be inserted onto an inner side of and connected to the light reflector 450.

The second mold frame 460 is disposed on the light reflector 450, and the adhesive member 920 is disposed between the light reflector 450 and the second mold frame 460. The second mold frame 460 is fixed to the light reflector 450. Although double-sided adhesive tape is used in this exemplary embodiment, a variety of adhesive agents can also be used as the adhesive member 920. Furthermore, although the second mold frame 460 is fixed to the light reflector 450 by the adhesive member, other fastening members can also be used.

The alignment groove 465 is formed in the top surface of the second mold frame 460, and the power cable 420 is disposed within the alignment groove 465. The alignment groove 465 may be formed in surfaces other than the top surface of the second mold frame 460.

Figure 8:
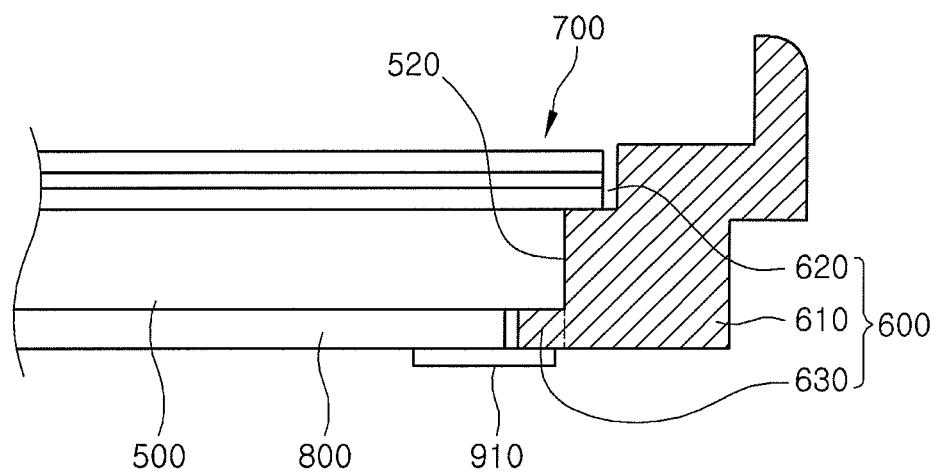
FIG. 8 is a cross-sectional view of a backlight assembly in accordance with an exemplary embodiment.
Figure 9:
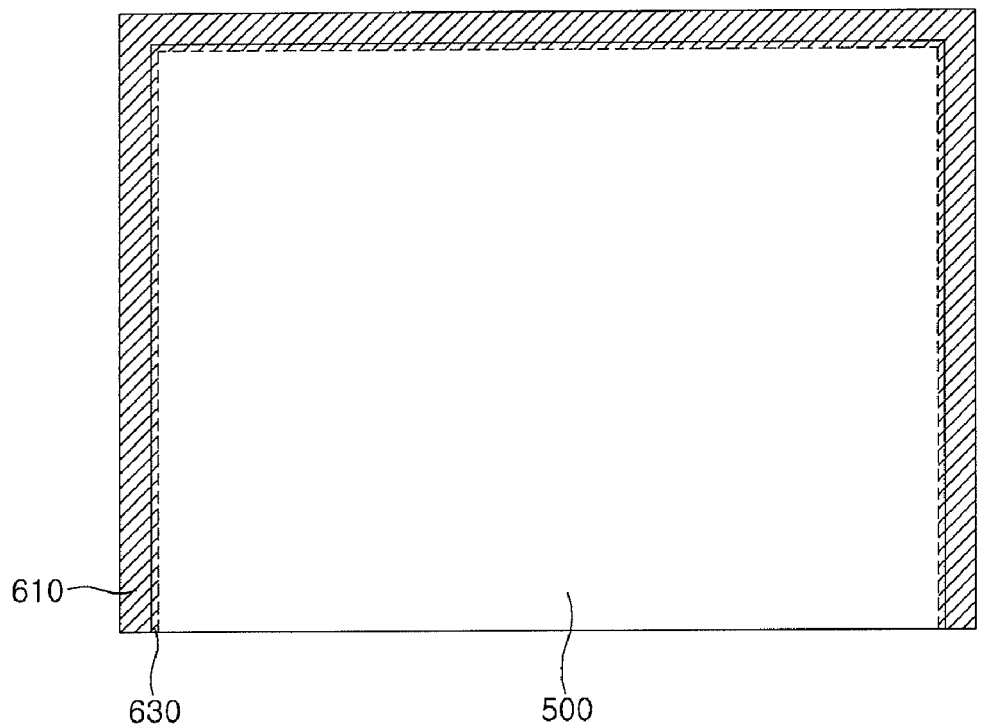
FIG. 9 is a plan view of a light guide plate and a first mold frame of the backlight assembly illustrated in FIG. 8.

FIG. 8 is a cross-sectional view of a backlight assembly in accordance with an exemplary embodiment, and FIG. 9 is a plan view of a light guide plate and a first mold frame in the backlight assembly illustrated in FIG. 8. The shape of the first mold frame in FIGS. 8 and 9 differs from the shape of the first mold frame described in connection with FIGS. 1-7.

Referring to FIGS. 8 and 9, the first mold frame 600 includes a sidewall portion 610, a mounting groove 620, and an overlapping portion 630.

The sidewall portion 610 of the first mold frame 600 runs around a perimeter of the light guide plate 500, and is connected to sides of the light guide plate 500, for example, the second side 520, the third side 530, and the fourth side 540. The mounting groove 620 is formed in an upper, inner surface of the sidewall portion 610. Consequently, the first mold frame 600 has a step-shaped cross-section to provide a receiving space. The plurality of optical sheets 700 are disposed within the receiving space.

The overlapping portion 630 of the first mold frame 600 extends inwardly from the lower side of the sidewall portion 610. In other words, the overlapping portion 630 extends toward the light guide plate 500 and thus overlaps a part of the bottom surface of the light guide plate 500. The overlapping portion 630 is integrally formed with the sidewall portion 610 and has a shape corresponding to the sidewall portion 610. That is, the overlapping portion 630 of the first mold frame 600 is disposed around a bottom periphery of the light guide plate 500 to support the light guide plate 500.

A reflection film 800 is disposed within the receiving space defined by the overlapping portion 630 of the first mold frame 600. In order to fix the reflection film 800 disposed under the light guide plate 500, an adhesive member 910 is disposed to overlap bottom surfaces of the reflection film 800 and the overlapping portion 630. Although adhesive tape is used in this exemplary embodiment, the adhesive member 910 is not limited thereto.

Due to the overlapping portion 630 of the first mold frame 600, a contact area of the first mold frame 600 with the light guide plate 500 increases and a total strength of the first mold frame increases.

Figure 10:
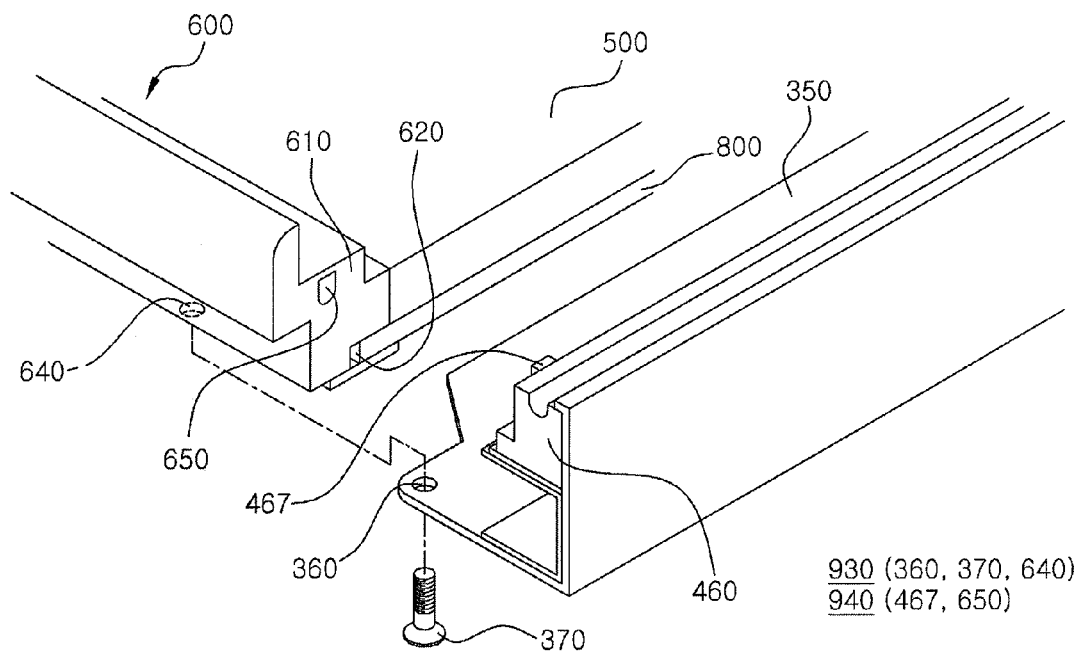
FIG. 10 is an exploded perspective view of a backlight assembly in accordance with an exemplary embodiment.

FIG. 10 is an exploded perspective view of a backlight assembly in accordance with an exemplary embodiment. The backlight assembly of FIG. 10 includes a coupling member.

Referring to FIG. 10, the backlight assembly includes a light guide plate 500, a first mold frame 600, a plurality of optical sheets (not shown), a reflection film (not shown), a light source unit 400, a second mold frame 460, a back cover 350, a first coupling member 930, and a second coupling member 940. The light guide plate 500 and the first mold frame 600 are integrally formed.

The first coupling member 930 includes a first coupling hole 360, a second coupling hole 640, and a screw 370. The first coupling hole 360 is formed, for example, on two ends of a back cover 350. The second coupling hole 640 is formed in bottom surfaces of a sidewall portion 610 of the first mold frame 600. The location and size of the first coupling holes 360 correspond to those of the second coupling holes 640. The screw 370 is inserted into the first and second coupling holes 360 and 640 to connect the back cover 350 to the first mold frame 600. Although the first coupling member 930 including the coupling holes 360 and 640 and the screw 370 is provided in this exemplary embodiment, the first coupling member 930 can be modified in various ways. For example, the first coupling member 930 may include a coupling protrusion formed in the back cover, and a coupling hole formed in the first mold frame 600 to receive the coupling protrusion inserted therein.

The second coupling member 940 fixes the light source unit 400 to the first mold frame 600. The second coupling member 940 includes a coupling groove 650 and a coupling protrusion 467. The coupling groove 650 is formed, for example, on two ends of the sidewall portion 610 of the first mold frame 600, and the coupling protrusion 467 is formed to correspond to the coupling groove 650 on two ends of the second mold frame 460. The coupling protrusion 467 may be integrally formed with the second mold frame 460. The location, size and shape of the coupling protrusions 467 correspond to those of the coupling grooves 650.

In an alternative exemplary embodiment, the second coupling member 940 may include a coupling protrusion formed on two ends of the sidewall portion 610 of the first mold frame 600, and a coupling groove formed on two ends of the second mold frame 460.

The first coupling member 930 and the second coupling member 940 can connect the light source unit more tightly to the first mold frame.

Figure 11:
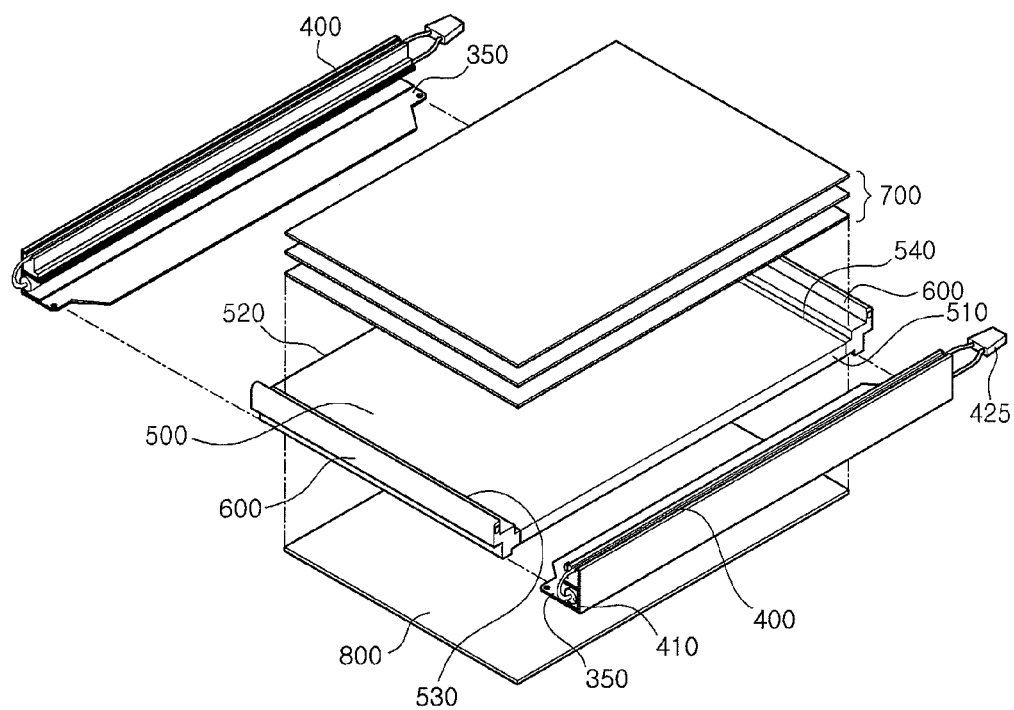
FIG. 11 is an exploded perspective view of a backlight assembly in accordance with an exemplary embodiment.

FIG. 11 is an exploded perspective view of a backlight assembly in accordance with an exemplary embodiment. The backlight assembly of FIG. 11 includes more light source units than the backlight assembly illustrated in FIGS. 1 through 7.

Referring to FIG. 11, the backlight assembly includes a light guide plate 500, a first mold frame 600, a plurality of optical sheets 700, a reflection film 800, two light source units 400, two second mold frames 460, and two back covers 350. The light guide plate 500 and the first mold frame 600 are integrally formed.

Two sides of the light guide plate 500 and the first mold frame 600, which are integrally formed, are exemplarily described below. The light source units 400 and the second mold frames 460 are disposed on a first side 510 and a second side 520 of the light guide plate 500. Light emitted from the lamps 410 of the light source units 400 is incident onto the first side 510 and the second side 520 of the light guide plate 500.

The first mold frame 600 is connected to and integrally formed with the sides of the light guide plate 500 on a third side 530 and a fourth side 540 of the light guide plate 500.

Figure 12:
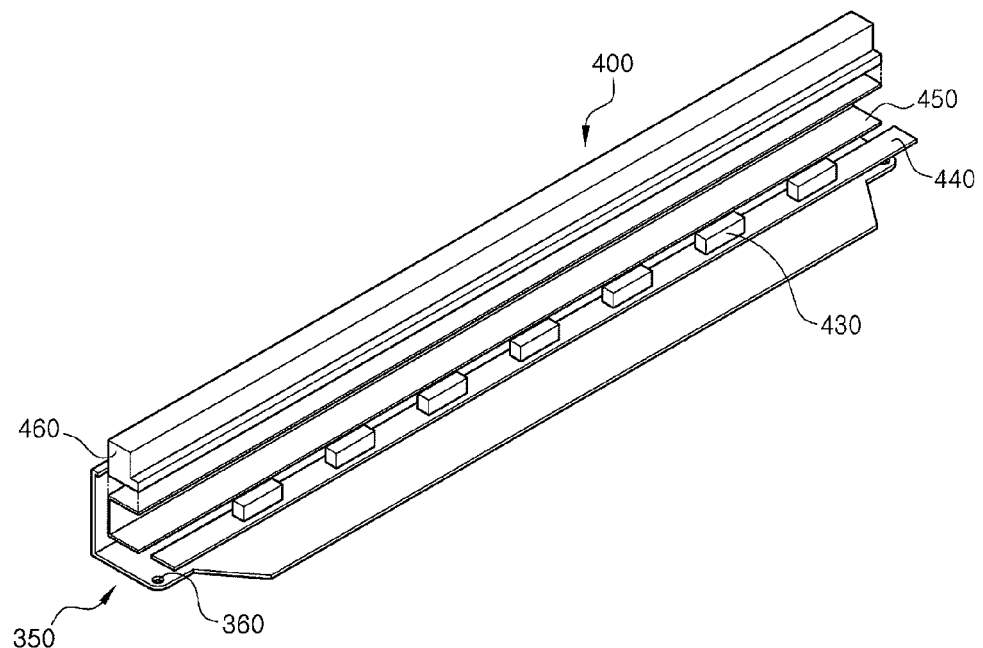
FIG. 12 is an exploded perspective view of a light source unit and a back cover in a backlight assembly in accordance with an embodiment.
Figure 13:
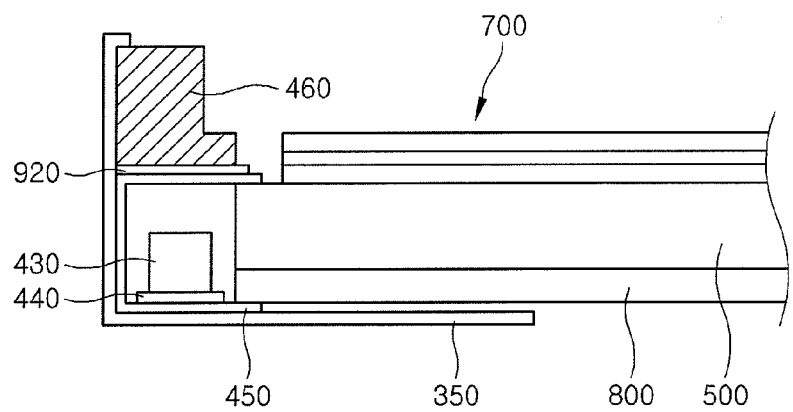
FIG. 13 is a cross-sectional view of a backlight assembly in accordance with an embodiment.

FIG. 12 is an exploded perspective view of a light source unit and a back cover in a backlight assembly in accordance with an embodiment, and FIG. 13 is a cross-sectional view of the backlight assembly shown in FIG. 12. The backlight assembly of FIGS. 12 and 13 includes a light emitting diode (LED) as the light source of the light source unit.

Referring to FIGS. 12 and 13, the light source unit 400 includes a plurality of LEDs 430, a printed circuit board (PCB) 440, and a light reflector 450. A second mold frame 460 is connected to the light source unit 400 by an adhesive member 920.

The LEDs 430 may be white LEDs, which emit white light, or red/green/blue (R/G/B) LEDs, which respectively emit red, green, and blue light.

The light source unit 400 is disposed on at least one side of the light guide plate 500 and the first mold frame 600, which are integrally formed. Light emitted from the LEDs 430 of the light source unit 400 is incident onto the light guide plate 500.

Figure 14:
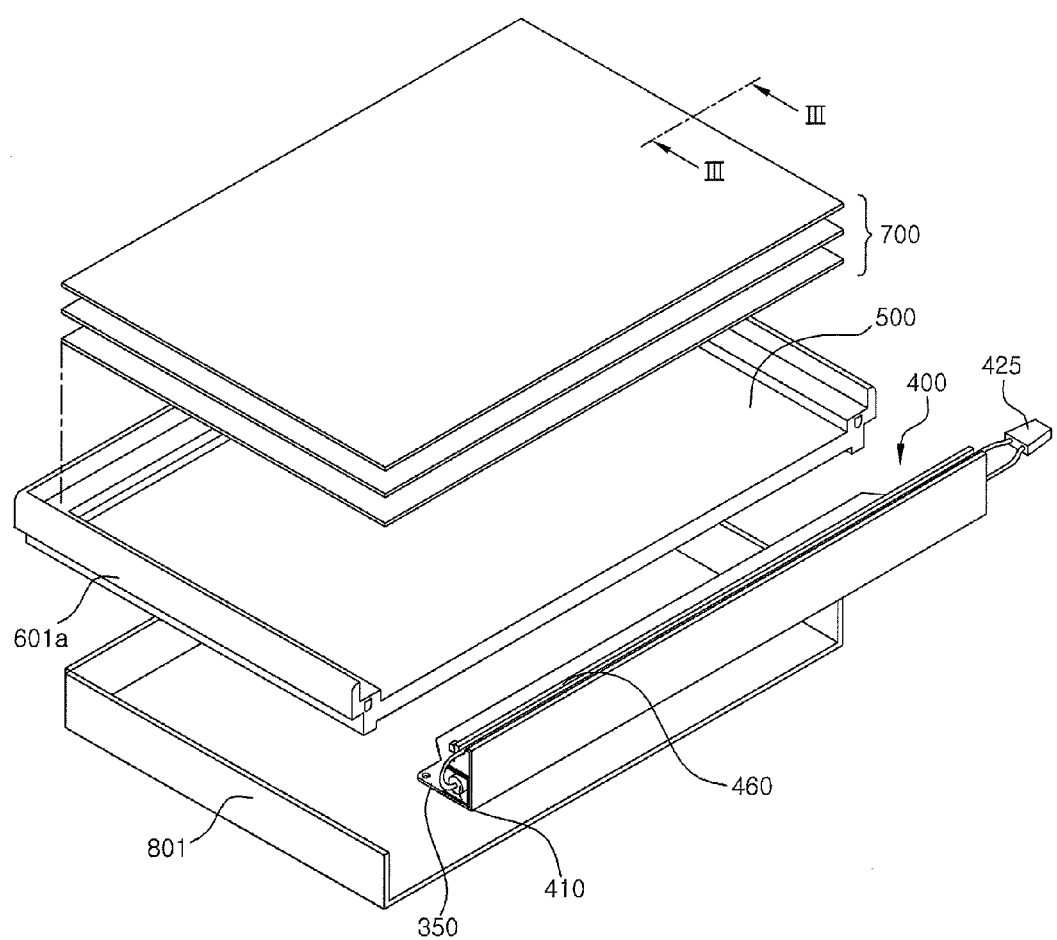
FIG. 14 is an exploded perspective view of a backlight assembly in accordance with an exemplary embodiment.
Figure 15:
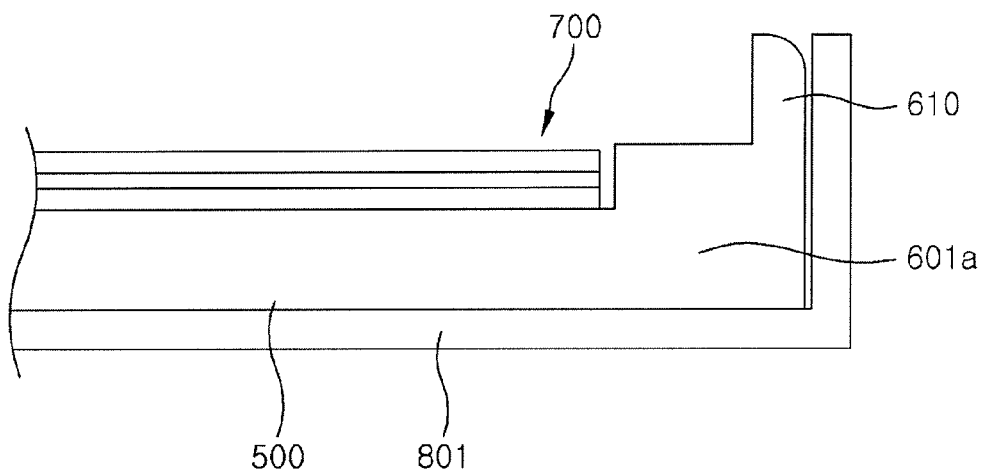
FIG. 15 is a cross-sectional view taken along line III-III of FIG. 14.

A backlight assembly in accordance with an embodiment will be described in the following in detail with reference to FIGS. 14 and 15. FIG. 14 is an exploded perspective view of a backlight assembly in accordance with an exemplary embodiment. FIG. 15 is a cross-sectional view taken along line III-III of FIG. 14.

The backlight assembly of the embodiment includes a light guide plate 500 and a first mold frame 601a, which are integrally made of the same material, and a reflection film 801 is extended to the outer surface of the sidewall portion 610 of the first mold frame 601a. Other aspects of the backlight assembly are similar to those of the previous embodiment, so they will not be described here.

The first mold frame 601a is made of transparent material, and PMMA may be used as the material.

The light guide plate 500 and the first mold frame 601a can be integrally formed by injection molding, but the manufacturing method is not limited to injection molding.

The light guide plate 500 is formed in a rectangular or square form, and the cross section may be formed in a parallel form with a fixed thickness or in a wedge form where the thickness of the cross section gradually decreases in the direction of the other end. The first mold frame 601a may be form along the side of the light guide plate 500. The first mold frame 601a may be formed on the remaining sides exempting the side where the light source unit 400 is disposed. That is, in the case where the light source unit is disposed only at one side of the light guide source 500, the first mold frame 601a can be formed on other three sides where the light source unit 400 is not disposed. Further, in the case where the light source unit is positioned facing at both sides of the light guide plate 500, the first mold frame 601a may be formed facing at the remaining two sides where the light source unit 400 is not disposed. The liquid crystal panel 100 is disposed on the upper end of the first mold frame 601a.

The first mold frame 601a is formed by light-permeable resin as in the light guide plate 500, so the light generated in the light source unit may leak outside. In order to prevent the leakage of the light, the reflection film 801 is disposed in a manner that surrounds the sidewall portion 610 of the first mold frame 601a.

The reflection film 801 reflects light emitted from the bottom surface of the light guide plate 500 toward the upper surface, is overlapped with the bottom surface of the light guide plate 500, and is extended to the outer side of the sidewall portion 610 of the first mold frame 601a. That is, the reflection film 801 is formed in a structure that surrounds up to the lower surface of the light guide plate 500 and the outer side of the sidewall portion 610 of the first mold frame 601a. Hence, light emitted from the light source unit 400 may also be emitted to the upper surface of the light guide plate 500.

If the first mold frame 601a is formed at three sides of the light guide plate 500, the reflection film 801 is formed in such a manner that the three sides are bent, and if the first mold frame 601a is formed at two sides of the light guide plate 500, the reflection film 801 is formed in such a manner that the two sides are bent.

Figure 16:
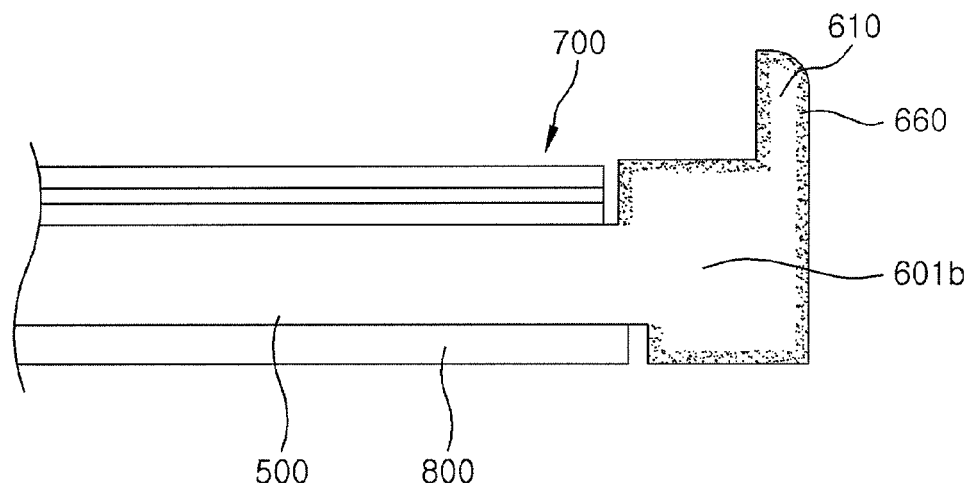
FIG. 16 is a cross-sectional view of a backlight assembly in accordance with an exemplary embodiment.

A backlight assembly according to an embodiment will be described in detailed in the following with reference to FIG. 16. FIG. 16 is a cross-sectional view of a backlight assembly in accordance with an exemplary embodiment.

The backlight assembly according to the embodiment includes a reflection film 800 disposed only on the bottom surface of the light guide plate 500, and includes a light-shielding unit 660 in order to prevent the leakage of light through the first mold frame 601a. Other aspects of the backlight assembly are similar to those of the previous embodiment, so they are not described here.

The reflection film is disposed only on the bottom surface of the light guide plate 500, and reflects light emitted from the bottom surface of the light guide plate 500 toward the upper surface.

The light-shielding unit 660 prevents the leakage of light to the outside through the first mold frame 601b, can be formed at the outer side of the sidewall portion 610 of the first mold frame 601b, and can be form at the front side of the first mold frame 601b exempting the portion connected to the light guide plate 500. Such a light-shielding unit 660 can prevent the leakage of light in a certain direction by forming minute irregularities. For example, minute irregularities are formed on a mold for injection in a manner such as sandblast, and the light guide plate 500 and the first mold frame 601b can be formed by injection processing. Further, the light-shielding unit 660 can form irregular sides by machine-processing the first mold frame 601b, and paints through which light cannot pass can be applied.

Figure 17:
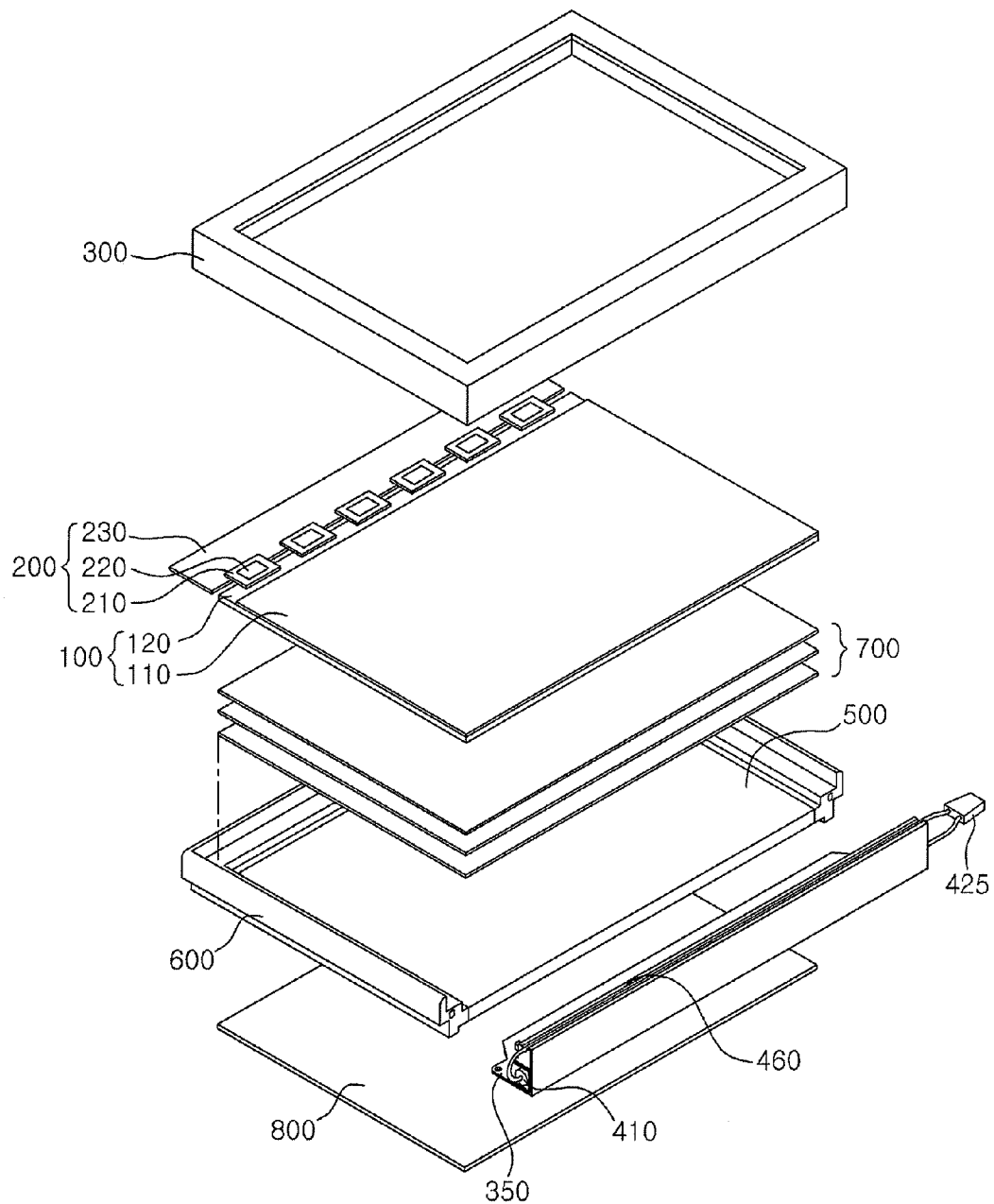
FIG. 17 is an exploded perspective view of an LCD having a backlight assembly in accordance with an exemplary embodiment.

FIG. 17 is an exploded perspective view of an LCD having a backlight assembly in accordance with an exemplary embodiment.

Referring to FIG. 17, the LCD includes a liquid crystal display panel 100, a driver circuit 200, a top chassis 300, and a backlight assembly. The backlight assembly includes a light guide plate 500, a first mold frame 600, a plurality of optical sheets 700, a reflection film 800, a light source unit 400, a second mold frame 460, and a back cover 350. The first mold frame 600 is integrally formed with the light guide plate 500.

The liquid crystal display panel 100 displays an image and includes a color filter substrate 110, a thin film transistor substrate 120, and a liquid crystal layer (not shown) interposed between the color filter substrate 110 and the thin film transistor substrate 120.

The driver circuit 200 includes a flexible printed circuit board (FPCB) 210, a drive integrated circuit (IC) (220), and a PCB 230. The FPCB 210 connects the PCB 230 to the thin film transistor substrate 120 and transmits R/G/B signals and power from the PCB 230 to the liquid crystal display panel 100.

The light source unit 400 is disposed on a side, e.g., a first side 510 (see FIG. 1), of the light guide plate 500 and the first mold frame 600 which are integrally formed. Light emitted from a lamp 410 of the light source unit 400 is incident onto the first side 510 of the light guide plate 500. The reflection film 800 is disposed under the light guide plate 500 and reflects light emitted from the bottom surface of the light guide plate 500 toward the liquid crystal display panel 100, thereby reducing loss of light.

The light guide plate 500, the first mold frame 600 integrally formed with the light guide plate 500, and the second mold frame 460 define a receiving space. The plurality of optical sheets 700 and the liquid crystal display panel 100 are disposed within the receiving space. The plurality of optical sheets 700 are disposed on the light guide plate 500. The liquid crystal display panel 100 is disposed on the plurality of optical sheets 700 and is supported by a stepped portion defined by the first mold frame 600 and the second mold frame 460.

Figure 18:
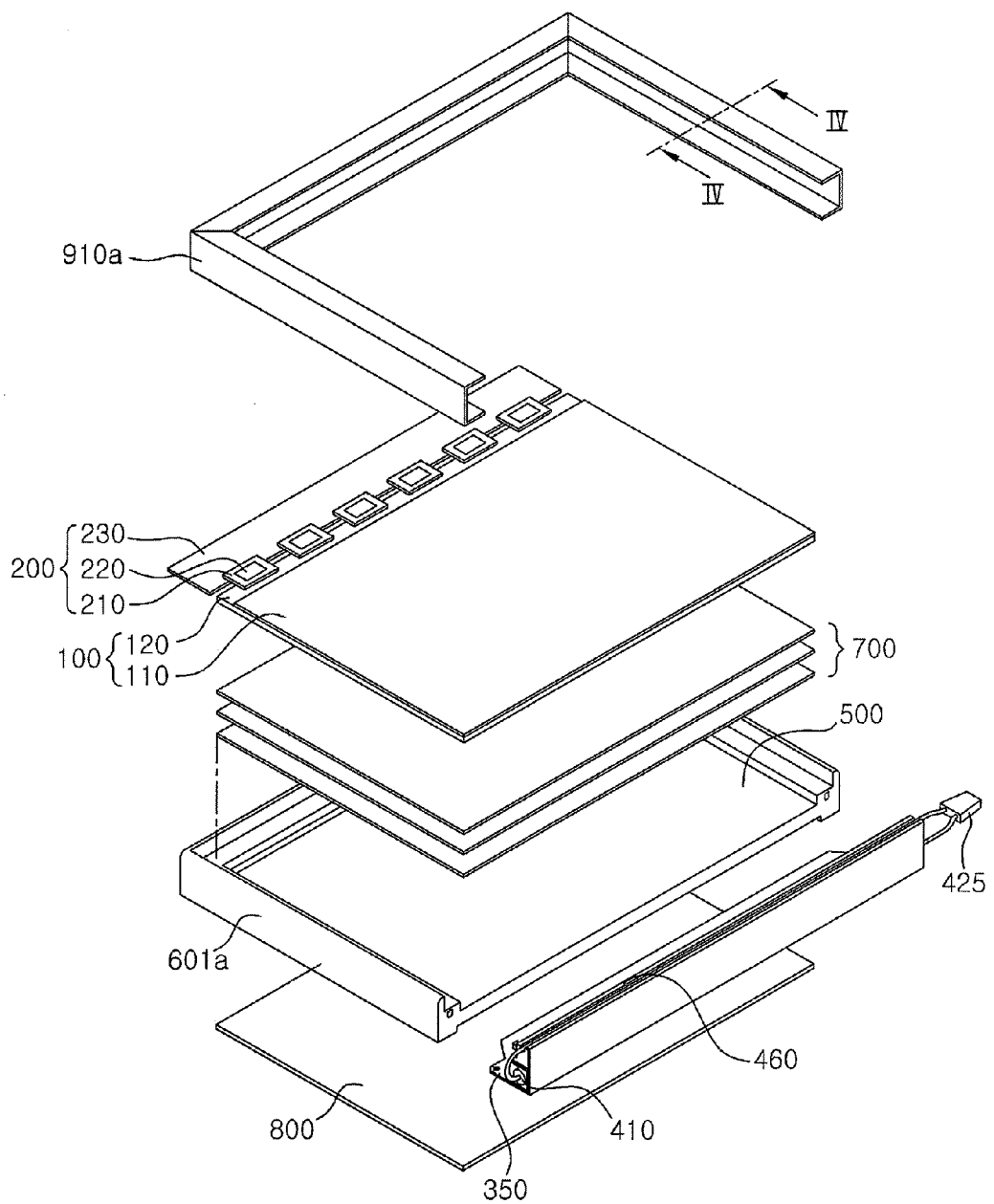
FIG. 18 is an exploded perspective view of an LCD having a backlight assembly in accordance with an exemplary embodiment.
Figure 19:
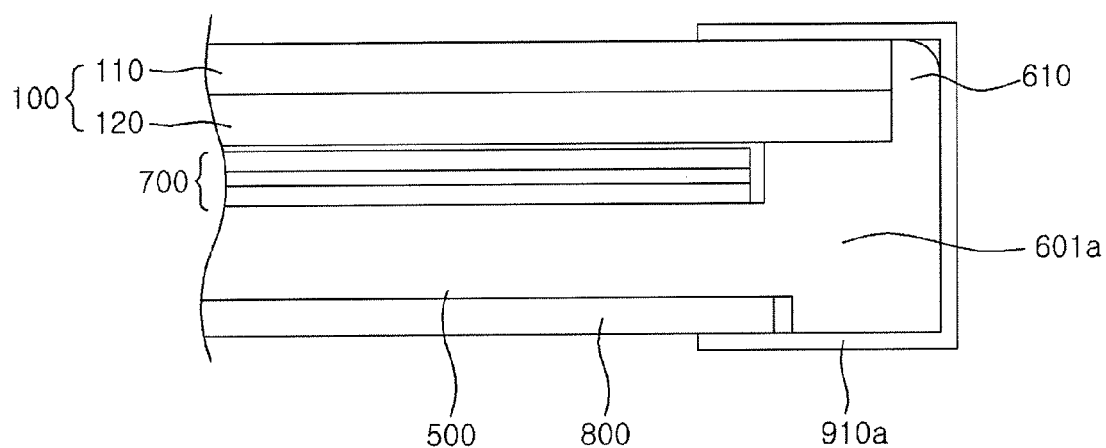
FIG. 19 is a cross-sectional view taken along line IV-IV of FIG. 18.

A liquid crystal display having a backlight assembly according to an embodiment will be described in detail in the following with reference to FIGS. 18 and 19. FIG. 18 is an exploded perspective view of an LCD having a backlight assembly in accordance with an exemplary embodiment. FIG. 19 is a cross-sectional view taken along line IV-IV of FIG. 18.

The backlight assembly of the embodiment includes a light guide plate 500 and a first mold frame 601a, which are integrally made of the same material, and a reflection film 801 is extended to the outer surface of the sidewall portion 610 of the first mold frame 601a. Other aspects of the backlight assembly are similar to those of the previous embodiment, so they will not be described here.

The liquid crystal display includes a liquid crystal display (LCD) panel 100, a driving circuit unit 200, and a backlight assembly, and the backlight assembly includes a light guide plate 500, a first mold frame 600 integrally formed with the light guide plate 500, a multiple of optical sheets 700, a reflection film 800, a light source unit 400, a second mold frame 460, a light-shielding sheet 910a, and a back cover 350.

The LCD panel 100 includes a color-filter substrate 110, a thin-film transistor film 120 and a liquid crystal layer (not shown) injected between the two substrates, and displays images. Such an LCD panel 100 is disposed on the upper surface of the light guide plate 100 and the first mold frame 601a. The optical sheet 700 is disposed between the LCD panel 100 and the light guide plate 500, and the reflection film 800 is disposed on the bottom surface of the light guide plate 500.

The light-shielding sheet 910a prevents the leakage of light to the sides exempting the LCD panel 100. Such a light-shielding sheet 910a surrounds all of the outer sides of the sidewall portion 610 of the first mold frame, and surrounds even the portions that are not the area of the LCD panel 100 where images are displayed, thereby preventing the leakage of light.

Referring to FIG. 19, the light-shielding sheet 901a covers the upper side of the LCD panel 100, the sidewall portion of the first mold frame 601a, and a portion of the reflection film 800. Such a light-shielding sheet 910a is made of light-shielding material, and one side can be formed by an adhesive sheet.

Further, the light-shielding sheet 910a combines the LCD panel 100, the first mold frame 601a and the reflection plate 800. That is, even though a top chassis such as the LCD illustrated in FIG. 17 is exempted, the LCD panel 100, the first mold frame 601a and the reflection plate 800 can be combined.

As described above, because the light guide plate and the mold frame are integrally formed by the injection molding, the strength of the mold frame and the light guide plate increases. Therefore, the bending and tilting of the mold frame can be prevented. Furthermore, the shrinkage phenomenon during a high temperature reliability test can be prevented and the "pooling" phenomenon caused when the light guide plate is mounted to the mold frame can also be prevented.

Moreover, the number of assembling processes decreases and the assembling time decreases. Consequently, manufacturing productivity and reliability of the LCD can be significantly increased.

Although the backlight assembly and the liquid crystal display having the same have been described with reference to the exemplary embodiments, they are not limited thereto. Therefore, it will be readily understood by those skilled in the art that various modifications and changes can be made thereto without departing from the spirit and scope of the present invention defined by the appended claims.

What is claimed is:

1. A backlight assembly, comprising:
   a light guide plate;
   a first mold frame integrally connected to the light guide plate to form a continuous piece with the light guide plate;
   a light source unit disposed on at least one side of the light guide plate and comprising a light source spaced apart from the at least one side of the light guide plate;
   a light reflector surrounding the light source and connected to the light guide plate; and
   a second mold frame connected to the first mold frame and disposed on only a top surface of the light reflector, wherein the top surface of the light reflector is a single plane, and wherein an alignment groove is formed on a top surface of the second mold frame.

2. The backlight assembly of claim 1, wherein the first mold frame comprises a sidewall portion connected to sides of the light guide plate to define a receiving space.

3. The backlight assembly of claim 1, wherein the light guide plate is formed of a light transparent resin, and the first mold frame is formed of a light opaque resin and has a greater hardness than the light guide plate.

4. The backlight assembly of claim 2, wherein the light source unit is disposed on a first side of the light guide plate, and the sidewall portion of the first mold frame is connected to sides of the light guide plate other than the first side.

5. The backlight assembly of claim 2, wherein the light source unit is disposed on a first side and a second side of the light guide plate, the second side being opposite to the first side, and the sidewall portion of the first mold frame is connected to sides of the light guide plate other than the first and second sides.

6. The backlight assembly of claim 2, further comprising:
   a plurality of optical sheets disposed within the receiving space; and
   a reflection film disposed under the light guide plate.

7. The backlight assembly of claim 6, wherein the first mold frame further comprises a groove in a portion of the sidewall portion, and the reflection film is disposed within the groove.

8. The backlight assembly of claim 7, further comprising an adhesive member overlapping bottom surfaces of the reflection film and the sidewall portion of the first mold frame.

9. The backlight assembly of claim 6, wherein the first mold frame further comprises an overlapping portion extending inwardly from the sidewall portion and connected to a bottom surface of the light guide plate.

10. The backlight assembly of claim 9, further comprising an adhesive member overlapping bottom surfaces of the reflection film and the overlapping portion.

11. The backlight assembly of claim 2, further comprising:
    a back cover surrounding the light source unit; and
    a first coupling member fixing the back cover to the first mold frame.

12. The backlight assembly of claim 11, further comprising a second coupling member fixing the light source unit to the first mold frame.

13. The backlight assembly of claim 12, wherein the second coupling member comprises:
    a coupling groove or a coupling protrusion formed on two sides of the sidewall portion of the first mold frame; and
    a coupling protrusion or a coupling groove formed on two sides of the second mold frame.

14. The backlight assembly of claim 1, wherein the light source comprises:
    a lamp; and
    a power cable connected to two sides of the lamp.

15. The backlight assembly of claim 14, wherein the power cable is disposed within the alignment groove.

16. The backlight assembly of claim 1, wherein the light source unit further comprises an adhesive member disposed between the top surface of the light reflector and the second mold frame.

17. The backlight assembly of claim 1, wherein the light guide plate and the first mold frame are formed by light-permeable resin, and are integrally formed.

18. The backlight assembly of claim 17, wherein the light-permeable resin is polymethymethacrylate (PMMA).

19. The backlight assembly of claim 17, further comprising a reflection film that is disposed on the bottom surface of the light guide plate and the outer surface of the sidewall portion, and reflects light.

20. The backlight assembly of claim 17, wherein the first mold frame further includes a light-shielding unit.

21. The backlight assembly of claim 20, wherein the light-shielding unit is minute irregularities.

22. A liquid crystal display, comprising:
    a backlight assembly comprising:
    a light guide plate;
    a first mold frame formed of a material different from that of the light guide plate, and integrally connected to the light guide plate to form a continuous piece with the light guide plate;
    a light source unit disposed on a side of the light guide plate, wherein the light source unit comprises a light source spaced apart from the side of the light guide plate, and a light reflector surrounding the light source and connected to the light guide plate; and
    a second mold frame connected to the first mold frame and disposed on only a top surface of the light reflector, wherein the top surface of the light reflector is a single plane; and
    a liquid crystal display panel disposed on the backlight assembly, wherein an alignment groove is formed on a top surface of the second mold frame.

23. A liquid crystal display, comprising:
    a backlight assembly comprising:

a light guide plate;
a first mold frame formed of the same material as that of the light guide plate, and integrally formed with the light guide plate to form a continuous piece with the light guide plate;
a light source unit disposed on a side of the light guide plate, wherein the light source unit comprises a light source spaced apart from the side of the light guide plate, a light reflector surrounding the light source and connected to the light guide plate, and a light-shielding sheet that surrounds the edge of the LCD panel and the first mold frame, and prevents the leakage of light; and
a second mold frame connected to the first mold frame and disposed on the light reflector, wherein the top surface of the light reflector is a single plane; and
a liquid crystal display panel disposed on the backlight assembly, wherein an alignment groove is formed on a top surface of the second mold frame.

24. The liquid crystal display of claim 22, wherein the alignment groove faces a side on which the liquid crystal display panel is disposed.

* * * * *